(12) United States Patent
Yokoyama et al.

(10) Patent No.: US 11,111,840 B2
(45) Date of Patent: Sep. 7, 2021

(54) COOLING DEVICE FOR ENGINE, AND FAILURE DETERMINATION METHOD THEREOF

(71) Applicant: Mazda Motor Corporation, Hiroshima (JP)

(72) Inventors: Nobuhiko Yokoyama, Hiroshima (JP); Takafumi Nishio, Otake (JP); Kuniaki Wada, Hatsukaichi (JP); Takahiro Yamamoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/809,824

(22) Filed: Mar. 5, 2020

(65) Prior Publication Data

US 2020/0332703 A1    Oct. 22, 2020

(30) Foreign Application Priority Data

Apr. 22, 2019   (JP) .............................. JP2019-080775

(51) Int. Cl.
*F01P 11/18*   (2006.01)
*F01P 7/14*   (2006.01)
*G01M 15/04*   (2006.01)

(52) U.S. Cl.
CPC .................. *F01P 11/18* (2013.01); *F01P 7/14* (2013.01); *G01M 15/048* (2013.01);
(Continued)

(58) Field of Classification Search
CPC ........ F01P 11/18; F01P 7/14; F01P 2007/146; F01P 2025/04; F01P 2025/32;
(Continued)

(56) References Cited

U.S. PATENT DOCUMENTS

2013/0263800 A1* 10/2013 Lee .......................... F01P 7/16
123/41.08
2018/0073423 A1* 3/2018 Speichinger ........ G01M 15/048

FOREIGN PATENT DOCUMENTS

JP   H10220639 A   8/1998
JP   2004076647 A   3/2004

OTHER PUBLICATIONS

European Patent Office, Extended European Search Report Issued in Application No. 20160843.7, dated Aug. 18, 2020, Germany, 8 pages.

* cited by examiner

*Primary Examiner* — Joseph J Dallo
*Assistant Examiner* — Yi-Kai Wang
(74) *Attorney, Agent, or Firm* — Alleman Hall Creasman & Tuttle LLP

(57) ABSTRACT

When an engine rotation speed is lower than a reference rotation speed, first failure determination in which failure of a flow rate control valve is determined based on a pressure change of cooling water detected by a pressure sensor is executed, when a valve closing instruction to switch the flow rate control valve from an opened state to a closed state is output from a valve control device; and when an engine rotation speed is equal to or higher than the reference rotation speed, second failure determination in which failure of the flow rate control valve is determined based on a pressure change of cooling water detected by a pressure sensor is executed, when a valve opening instruction to switch the flow rate control valve from a closed state to an opened state is output from the valve control device.

5 Claims, 10 Drawing Sheets

(52) U.S. Cl.
CPC ..... *F01P 2007/146* (2013.01); *F01P 2025/04* (2013.01); *F01P 2031/20* (2013.01)

(58) Field of Classification Search
CPC .. F01P 7/165; F01P 2003/028; F01P 2060/16; F01P 2060/08; F01P 2060/04; F01P 2060/045; F01P 3/02; F01P 2031/00; F01P 2031/20; G01M 15/048
USPC ..................................................... 123/41.15
See application file for complete search history.

COOLING DEVICE FOR ENGINE, AND FAILURE DETERMINATION METHOD THEREOF

CROSS-REFERENCE TO RELATED APPLICATION

This application is based on Japanese Patent application No. 2019-080775 filed in Japan Patent Office on Apr. 22, 2019, the contents of which are hereby incorporated by reference.

TECHNICAL FIELD

The present invention relates to a cooling device for an engine including a water pump to be driven to rotate by the engine, and a failure determination method of the cooling device.

BACKGROUND

An engine provided in a vehicle and the like is configured in such a way that cooling water is pressurized and fed to an engine body and accessories by a water pump to be driven to rotate by the engine. Further, a flow rate control valve capable of opening and closing a passage through which cooling water flows is provided in the passage, and a flow rate of cooling water is changed by opening and closing the flow rate control valve.

In an engine in which a flow rate control valve is provided, cooling water of an appropriate amount may not be supplied to an engine body and the like due to failure of the flow rate control valve. In view of the above, it is required to determine whether the flow rate control valve has failed. Japanese Unexamined Patent Application Publication No. 2004-76647 discloses a configuration in which a temperature sensor for detecting a temperature of cooling water is provided in a passage through which cooling water flows, and determination is made as to whether a flow rate control valve has failed, based on a temperature change of cooling water detected by the temperature sensor.

Even when a flow rate of cooling water changes, a temperature of cooling water gradually changes, and responsiveness of a temperature change of cooling water with respect to a flow rate change of cooling water is low. Therefore, a configuration of Japanese Unexamined Patent Application Publication No. 2004-76647, in other words, a configuration of determining whether a flow rate control valve has failed based on a change in temperature of cooling water involves an issue that it is not possible to immediately detect failure, even when the flow rate control valve has failed. Further, when detection of failure of the flow rate control valve is delayed, a temperature of the engine body may excessively rise, and the engine body may be damaged by delay of action against the failure. In another case, a temperature of the engine body may be excessively lowered, and combustion in the engine body may be unstabilized.

SUMMARY

In view of the above, an object of the present invention is to provide a cooling device for an engine, which enables to determine whether a flow rate control valve has failed at an early stage and with accuracy, and a failure determination method of the cooling device.

A cooling device for an engine according to one aspect of the present invention is a cooling device for an engine provided with a water pump to be driven to rotate by the engine. The cooling device includes: a cooling water passage for circulating cooling water discharged from the water pump via an engine body; a flow rate control valve capable of opening and closing the cooling water passage; a pressure sensor for detecting a pressure of cooling water flowing through the cooling water passage; a failure determination device for determining whether the flow rate control valve has failed; and a valve control device for controlling the flow rate control valve by outputting a valve opening/closing instruction to the flow rate control valve. The failure determination device executes, when an engine rotation speed is lower than a predetermined reference rotation speed, first failure determination in which failure of the flow rate control valve is determined based on a pressure change of cooling water detected by the pressure sensor, when a valve closing instruction to switch the flow rate control valve from an opened state to a closed state is output from the valve control device. The failure determination device executes, when an engine rotation speed is equal to or higher than the reference rotation speed, second failure determination in which failure of the flow rate control valve is determined based on a pressure change of cooling water detected by the pressure sensor, when a valve opening instruction to switch the flow rate control valve from a closed state to an opened state is output from the valve control device.

A failure determination method of a cooling device for an engine according to another aspect of the present invention is a failure determination method of a cooling device for an engine provided with a water pump to be driven to rotate by the engine, a cooling water passage for circulating cooling water discharged from the water pump via an engine body, a flow rate control valve capable of opening and closing the cooling water passage, a pressure sensor for detecting a pressure of cooling water flowing through the cooling water passage, and a valve control device for controlling the flow rate control valve by outputting a valve opening/closing instruction to the flow rate control valve. The method includes: when an engine rotation speed is lower than a predetermined reference rotation speed, executing first failure determination in which failure of the flow rate control valve is determined based on a pressure change of cooling water detected by the pressure sensor, when a valve closing instruction to switch the flow rate control valve from an opened state to a closed state is output from the valve control device; and when an engine rotation speed is equal to or higher than the reference rotation speed, executing second failure determination in which failure of the flow rate control valve is determined based on a pressure change of cooling water detected by the pressure sensor, when a valve opening instruction to switch the flow rate control valve from a closed state to an opened state is output from the valve control device.

DETAILED DESCRIPTION

In the following, an embodiment according to the present invention is described in detail with reference to the drawings.

(1) Overall Configuration of Engine

Figure 1:
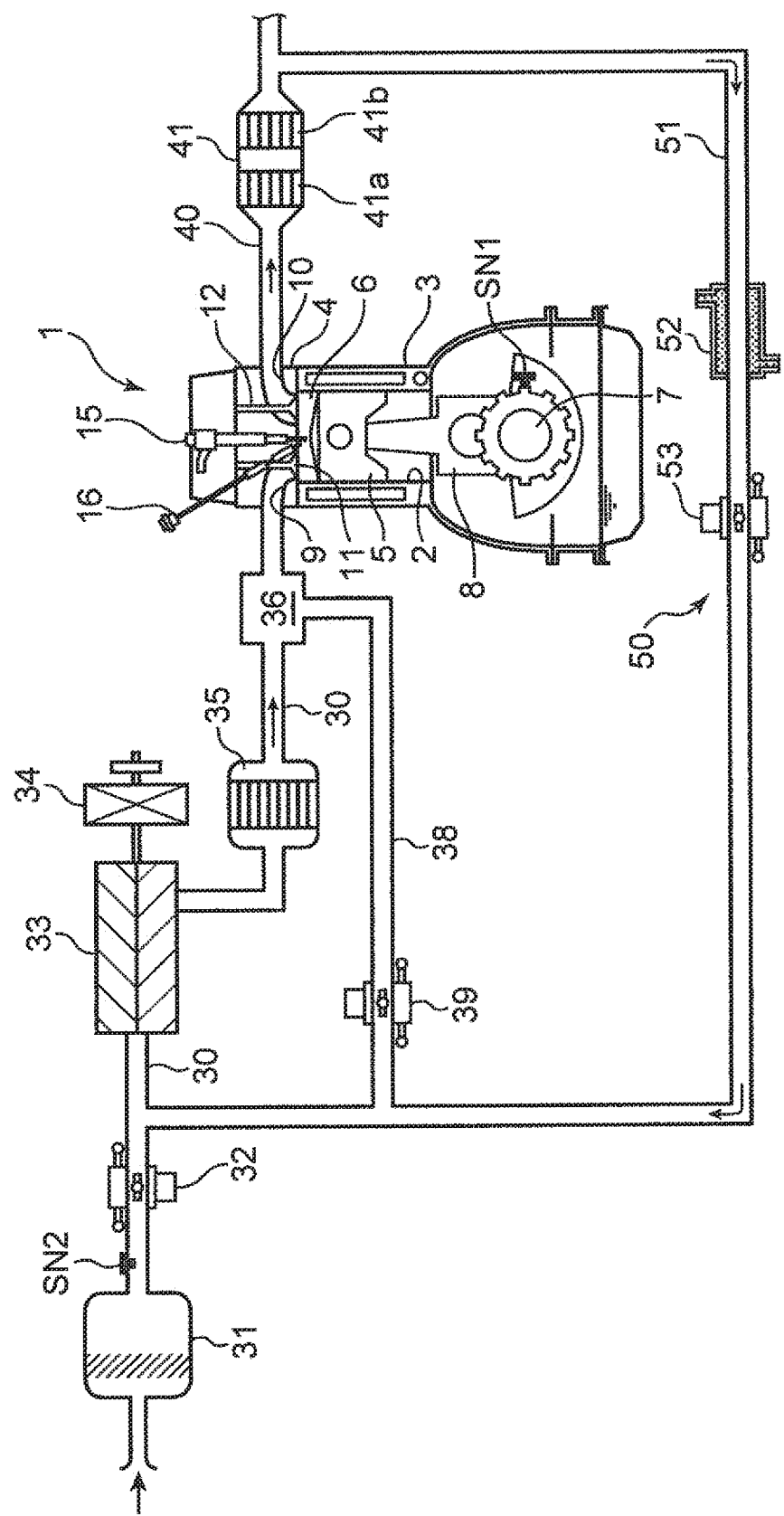
FIG. 1 is a system diagram schematically illustrating an overall configuration of an engine to which the present invention is applied.

FIG. 1 is a diagram illustrating a preferred embodiment of a vehicular engine (hereinafter, simply referred to as an engine) to which a control device according to the present invention is applied. The engine illustrated in FIG. 1 is a 4-cycle gasoline direct-injection engine to be mounted in a vehicle, as a power source for driving the vehicle. The engine includes an engine body 1, an intake passage 30 through which intake air to be introduced to the engine body 1 flows, an exhaust passage 40 through which exhaust gas to be discharged from the engine body 1 flows, and an external EGR device 50 for allowing a part of exhaust gas flowing through the exhaust passage 40 to return to the intake passage 30.

The engine body 1 includes a cylinder block 3 in which cylinders 2 are internally formed, a cylinder head 4 mounted on an upper surface of the cylinder block 3 in such a way as to close the cylinders 2 from above, and a piston 5 reciprocally and slidably received in each of the cylinders 2. The engine body 1 is typically of a multi-cylinder type in which a plurality of (e.g. four) cylinders 2 are provided. For simplification, description is made with respect to one cylinder 2.

A combustion chamber 6 is defined above the piston 5. Fuel containing gasoline as a main component is supplied to the combustion chamber 6 by injection from an injector 15 to be described later. Further, the supplied fuel is mixed with air within the combustion chamber 6 for combustion, and the piston 5 reciprocally moves up and down by receiving an expansion force by the combustion.

A crankshaft 7 being an output shaft of the engine body 1 is provided below the piston 5. The crankshaft 7 is connected to the piston 5 via a connecting rod 8, and is driven to rotate around an axis thereof, as the piston 5 reciprocally moves (up and down).

A crank angle sensor SN1 is mounted on the cylinder block 3. The crank angle sensor SN1 detects a rotational angle (crank angle) of the crankshaft 7, and a rotation number of the crankshaft 7 (engine rotation speed).

An intake port 9 for introducing air to be supplied through the intake passage 30 into the combustion chamber 6, an exhaust port 10 for drawing out exhaust gas generated in the combustion chamber 6 to the exhaust passage 40, an intake valve 11 for opening and closing an opening of the intake port 9 on the combustion chamber 6 side, and an exhaust valve 12 for opening and closing an opening of the exhaust port 10 on the combustion chamber 6 side are provided in the cylinder head 4. The intake valve 11 and the exhaust valve 12 are opened and closed in association with rotation of the crankshaft 7 by a dynamic valve mechanism including a pair of camshafts and the like, which are provided in the cylinder head 4.

The injector 15 for injecting fuel (gasoline) to the combustion chamber 6, and a spark plug 16 for igniting fuel-air mixture in which fuel injected from the injector 15 to the combustion chamber 6 and intake air are mixed are provided in the cylinder head 4.

The intake passage 30 is connected to one side surface of the cylinder head 4 in such a way as to communicate with the intake port 9. An air cleaner 31 for removing foreign matter within intake air, a throttle valve 32 which is openable and closable to adjust a flow rate of intake air, a supercharger 33 for feeding intake air, while compressing the intake air, an intercooler 35 for cooling intake air compressed by the supercharger 33, and a surge tank 36 are provided in this order in the intake passage 30 from the upstream side of the intake passage 30. An airflow sensor SN2 for detecting a flow rate of intake air is provided at a position between the air cleaner 31 and the throttle valve 32 in the intake passage 30.

The supercharger 33 is a mechanical supercharger mechanically interconnected to the engine body 1 via an electromagnetic clutch 34. As the supercharger 33, it is possible to employ any of conventional superchargers of Lysholm type, Roots type, or centrifugal type, for example.

A bypass passage 38 for bypassing the supercharger 33 is provided in the intake passage 30. The bypass passage 38 connects the surge tank 36 and an EGR passage 51 to be described later to each other. An openable bypass valve 39 is provided in the bypass passage 38.

The exhaust passage 40 is connected to the other side surface of the cylinder head 4 in such a way as to communicate with the exhaust port 10. A catalyst converter 41 is provided in the exhaust passage 40. The catalyst converter 41 is incorporated with a three-element catalyst 41a for purifying harmful components (HC, CO, NOx) contained in exhaust gas flowing through the exhaust passage 40, and a gasoline particulate filter (GPF) 41b for trapping particulate materials (PM) contained in exhaust gas.

The external EGR device 50 includes the EGR passage 51 for connecting the exhaust passage 40 and the intake passage 30, an EGR valve 53 for opening and closing the EGR passage 51, and an EGR cooler 52 provided in the EGR passage 51. The EGR passage 51 connects a downstream portion of the exhaust passage 40 with respect to the catalyst converter 41, and a portion of the intake passage 30 between the throttle valve 32 and the supercharger 33 to each other. The EGR cooler 52 cools, by heat exchange, exhaust gas that returns to the intake passage 30 from the exhaust passage 40 through the EGR passage 51.

A geometric compression ratio of the cylinder 2, namely, a ratio between a volume of the combustion chamber 6 when the piston 5 is at a top dead center, and a volume of the combustion chamber 6 when the piston 5 is at a bottom dead center, is set not smaller than 13 but not larger than 30, preferably, to a high compression ratio of not smaller than 14 but not larger than 18.

In the present embodiment, in a low speed range in which an engine rotation speed is equal to or lower than a predetermined rotation speed, SPCCI combustion in which a part of fuel-air mixture is compression ignited is performed.

Thus, a geometric compression ratio of the cylinder 2 is set to a relatively high value as described above in such a way that compression ignition of fuel-air mixture is appropriately achieved.

SPCCI combustion is partial compression ignition combustion in which SI combustion and CI combustion are combined. SI combustion is a combustion pattern in which fuel-air mixture is ignited by sparks generated from the spark plug 16, and the fuel-air mixture is forcibly combusted by flame propagation such that a combustion area spreads from the ignition point to the periphery. CI combustion is a combustion pattern in which fuel-air mixture is combusted by self-ignition in a sufficiently high-temperature and high-pressurized environment by compression and the like of the piston 5. SPCCI combustion in which SI combustion and CI combustion are combined is a combustion pattern in which a part of fuel-air mixture within the combustion chamber 6 is subjected to SI combustion by spark ignition to be performed in an environment immediately before the fuel-air mixture is self-ignited, and after the SI combustion (after a further increase in temperature and pressure accompanied by the SI combustion), the other part of the fuel-air mixture within the combustion chamber 6 is subjected to CI combustion by self-ignition. In other words, in a low speed range, fuel and air are mixed in advance, and a part of the fuel-air mixture is forcibly combusted by ignition from the spark plug 16, and the remaining part of the fuel-air mixture is compression ignited by thermal energy by the combustion. "SPCCI" is abbreviation of Spark Controlled Compression Ignition. In the present embodiment, in a high speed range in which an engine rotation speed is high as compared with a low speed range, general SI combustion is performed.

(2) Overall Configuration of Cooling Device

Figure 2:
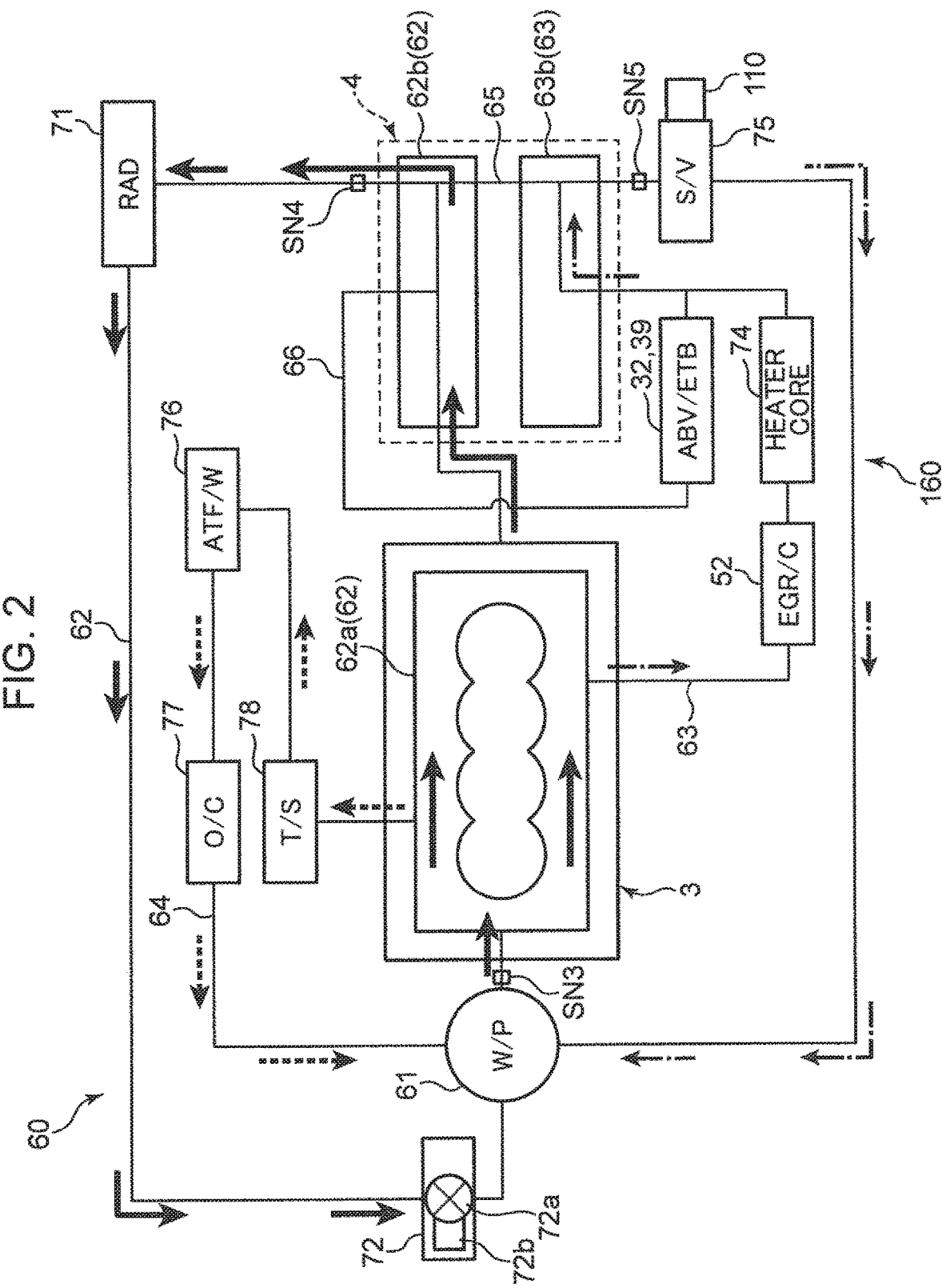
FIG. 2 is a circuit diagram schematically illustrating an overall configuration of a cooling device for the engine.

FIG. 2 is a circuit diagram illustrating an overall configuration of a cooling device 60 for the engine. As illustrated in FIG. 2, the cooling device 60 includes a water pump (W/P) 61, a radiator (RAD) 71, and cooling water passages 62 to 66 (a main cooling water passage 62, an EGR cooling water passage 63, an ATF cooling water passage 64, a communication passage 65, and a valve passage 66) for circulating cooling water.

The water pump 61 is a pump for discharging cooling water, and is mounted on one side surface of the cylinder block 3. The water pump 61 is driven to rotate by the engine body 1. Specifically, the water pump 61 is connected to the crankshaft 7 via a belt, and discharges cooling water by being driven to rotate by the crankshaft 7.

The radiator 71 is a heat exchanger for cooling cooling water. Cooling water is cooled by traveling air and the like of the vehicle, when passing through the radiator 71.

(Main Cooling Water Passage)

As indicated by the solid-line arrows in FIG. 2, the main cooling water passage 62 is a passage for circulating cooling water to be discharged from the water pump 61 in such a way as to return the cooling water to the water pump 61 via a block-side water jacket 62a formed in the cylinder block 3, a combustion-chamber-side water jacket 62b formed in the cylinder head 4, and the radiator 71.

Figure 3:
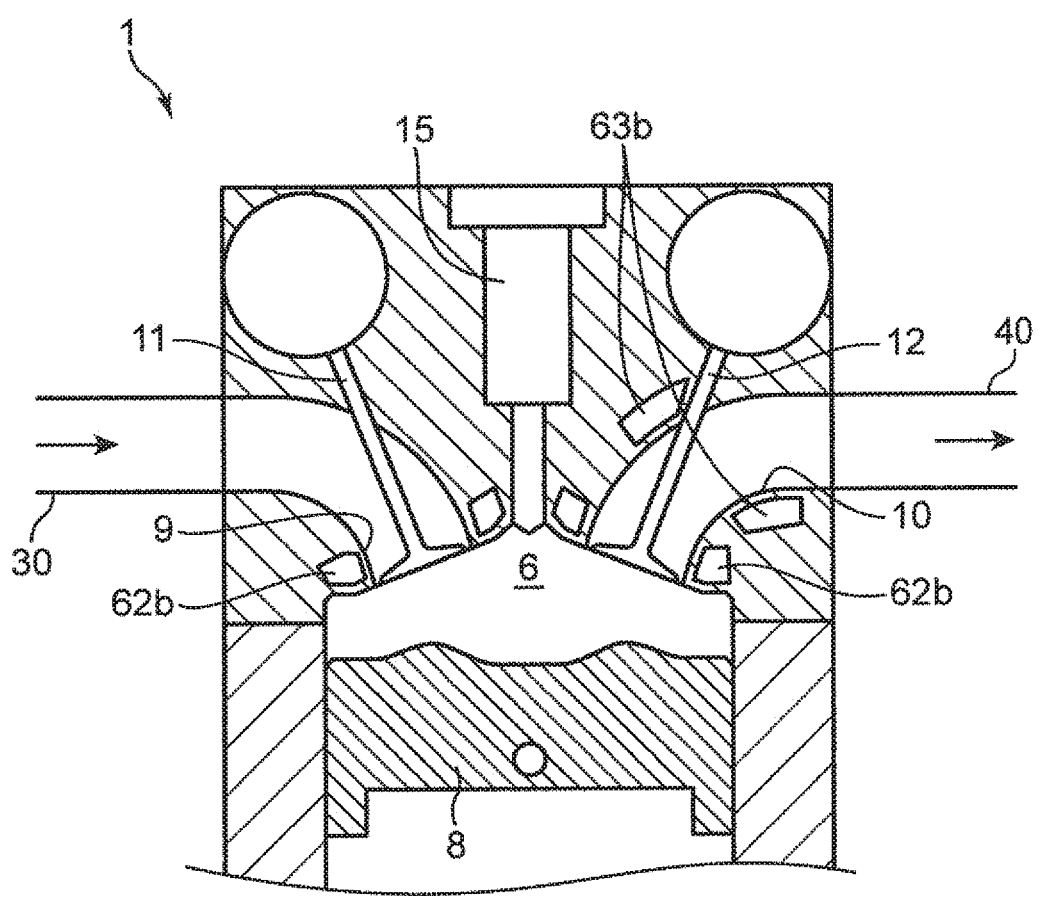
FIG. 3 is a schematic cross-sectional view illustrating essential parts of an engine body.

As illustrated in FIG. 3, the combustion-chamber-side water jacket 62b is a water jacket, which is formed in the vicinity of the combustion chamber 6 of the cylinder head 4, and in the periphery of each of valve sheet portions of the intake port 9 and the discharge port 10.

A first thermostat valve 72 is formed at a position between the radiator 71 and the water pump 61 in the main cooling water passage 62, specifically, at a position downstream with respect to the radiator 71 and upstream with respect to the water pump 61 in a flow direction of cooling water indicated by the solid-line arrows in FIG. 2.

The first thermostat valve 72 includes a valve body 72a (hereinafter, referred to as a TS valve body 72a) for opening and closing the main cooling water passage 62, namely, the TS valve body 72a, which is opened (fully opened) when a temperature of cooling water flowing through the TS valve body 72a reaches a predetermined valve opening temperature or higher, and closed (fully closed) when a temperature of cooling water falls below the valve opening temperature. The first thermostat valve 72 is a variable-type thermostat valve capable of changing a valve opening temperature, and includes a thermostat heater 72b for changing the valve opening temperature. The thermostat heater 72b is heated by being energized. As an amount of energization to the thermostat heater 72b increases, the valve opening temperature is lowered. In other words, when an amount of energization to the thermostat heater 72b is large, and a temperature of the thermostat heater 72b is high, the TS valve body 72a is opened at a timing when a temperature of cooling water is lower, as compared with a case that an amount of energization to the thermostat heater 72b is small, and a temperature of the thermostat heater 72b is low. An amount of energization to the thermostat heater 72b is controlled by a PCM 100 to be described later.

When a temperature of cooling water is equal to or higher than the valve opening temperature, and the first thermostat valve 72 (TS valve body 72a) is in an opened state, cooling water is cooled by the radiator 71 by passing through the main cooling water passage 62. On the other hand, when the first thermostat valve 72 is in a closed state, flowing of cooling water through the main cooling water passage 62 is stopped, and cooling of cooling water by the radiator 71 is stopped.

A first water temperature sensor SN3 and a second water temperature sensor SN4 for detecting a temperature of cooling water flowing through the main cooling water passage 62 are provided in the main cooling water passage 62. The first water temperature sensor SN3 is provided at a position between the water pump 61 and the cylinder block 3, specifically, at a position downstream with respect to the water pump 61 and upstream with respect to the cylinder block 3 in a flow direction of cooling water indicated by the solid-line arrows in FIG. 2. The first water temperature sensor SN3 detects a temperature of cooling water flowing through the position. The second water temperature sensor SN4 is provided at a position between the cylinder head 4 and the radiator 71, specifically, at a position downstream with respect to the cylinder head 4 and upstream with respect to the radiator 71 in a flow direction of cooling water indicated by the solid-line arrows in FIG. 2. The second water temperature sensor SN4 detects a temperature of cooling water flowing through the position. Hereinafter, a temperature of cooling water detected by the first water temperature sensor SN3 is referred to as an engine water temperature, as necessary. It should be noted that a temperature of cooling water flowing through the TS valve body 72a of the first thermostat valve 72 is substantially the same as an engine water temperature to be detected by the first water temperature SN3. The first thermostat valve 72 is opened and closed depending on the engine water temperature.

(EGR Cooling Water Passage)

The EGR cooling water passage 63 is a passage for bypassing a part of the main cooling water passage 62.

As indicated by the one-dotted-chain-line arrows in FIG. 2, a part of cooling water flowing through the block-side water jacket 62a, which is included in the main cooling water passage 62, is introduced to the EGR cooling water passage 63. Cooling water introduced to the EGR cooling water passage 63 from the block-side water jacket 62a returns to the water pump 61 via an EGR cooler (EGR/C) 52, a heater core 74 for air conditioning, and an exhaust-port-side water jacket 63b formed in the cylinder head 4.

As illustrated in FIG. 3, the exhaust-port-side water jacket 63b is a water jacket, which is formed in the periphery of the exhaust port 10 and at a position downstream with respect to the combustion-chamber-side water jacket 62b (downstream in a flow direction of exhaust gas).

In this way, in the present embodiment, a passage 160 for circulating cooling water via the water pump 61 and the engine body 1 along a passage different from the main cooling water passage 62 is formed by a part of the main cooling water passage 62 including the block-side water jacket 62a, and the EGR cooling water passage 63. In the present embodiment, the cooling water flow passage 160 to be formed by a part of the main cooling water passage 62 including the block-side water jacket 62a, and the EGR cooling water passage 63 corresponds to a "cooling water passage" in the claims.

A flow rate control valve (S/V) 75 is interposed at a position between the cylinder head 4 and the water pump 61 in the EGR cooling water passage 63, specifically, at a position downstream with respect to the cylinder head 4 and upstream with respect to the water pump 61 in a flow direction of cooling water indicated by the one-dotted-chain-line arrows in FIG. 2.

Figure 4:
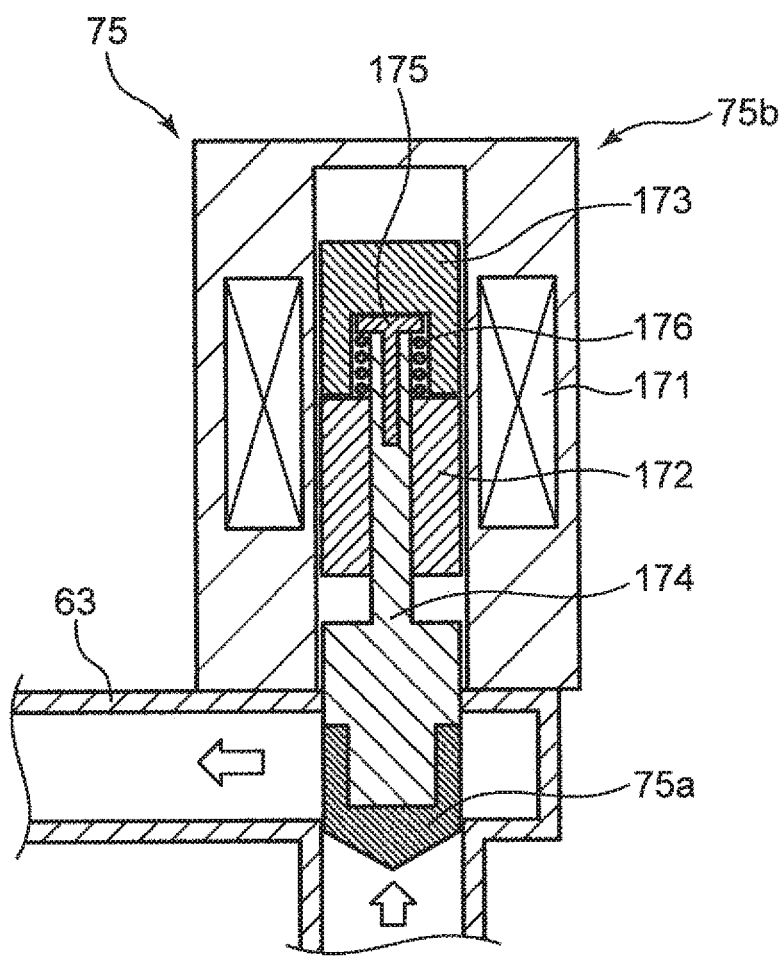
FIG. 4 is a schematic cross-sectional view of a flow rate control valve.
Figure 5:
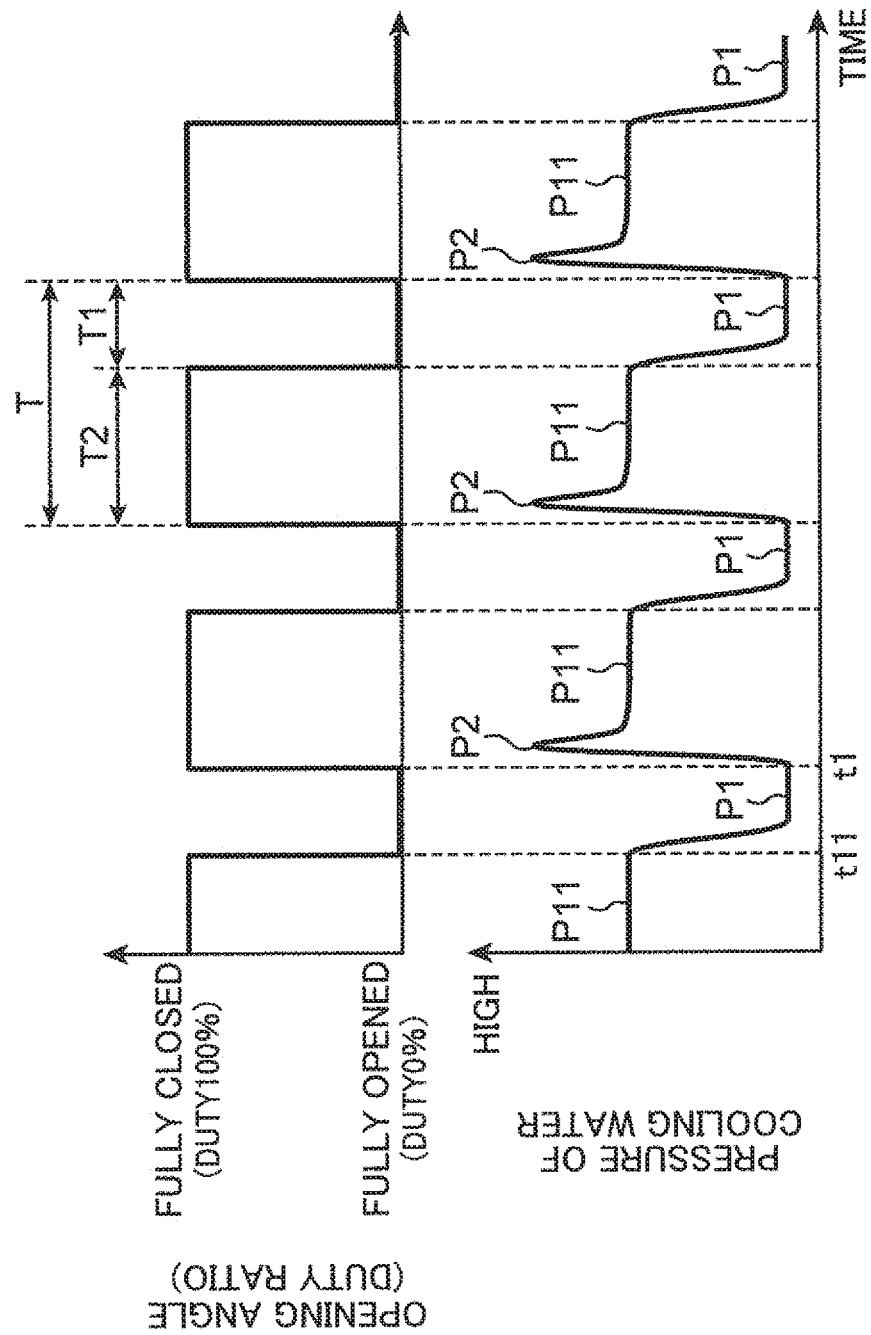
FIG. 5 is a diagram illustrating a change in opening angle of the flow rate control valve, and a pressure change of cooling water accompanied by the change in opening angle.

FIG. 4 is a schematic cross-sectional view of the flow rate control valve 75. FIG. 5 is a diagram illustrating an opening angle of the flow rate control valve 75 (a graph in the upper portion of FIG. 4), and a pressure of cooling water within the EGR cooling water passage 63, which is a pressure detected by a pressure sensor SN5 to be described later (a graph in the lower portion of FIG. 4). The graph in the lower portion of FIG. 4 schematically illustrates a pressure change of cooling water.

The flow rate control valve 75 is a solenoid-type opening/closing valve, and includes a valve body 75a for opening and closing the EGR cooling water passage 63, and a driving portion 75b for driving the valve body 75a by receiving electric power supply. The flow rate control valve 75 is of a normal open type. The valve body 75a is fully opened, when electric power supply to the driving portion 75b is stopped.

The driving portion 75b duty-controls the valve body 75a in such a way that the valve body 75a is opened and closed at a predetermined frequency. In other words, the flow rate control valve 75 is a duty control valve. As illustrated in FIG. 5, the valve body 75a is driven in such a way as to repeat a fully opened state and a fully closed state. Further, a flow rate of cooling water flowing through the valve body 75a is changed by changing a duty ratio, which is a ratio of a one-time energization period, in other words, a one-time valve closing period T2 with respect to a period (one cycle) T, which is a sum of a one-time deenergization period, in other words, a valve opening period T1 of the valve body 75a, and a one-time energization period, in other words, a valve closing period T2 of the valve body 75a. Electric power to be supplied to the driving portion 75b of the flow rate control valve 75 is controlled by a CSV control device 110 additionally provided to the flow rate control valve 75, and the PCM 100 to be described later. The CSV control device 110 supplies electric power to the driving portion 75b at a designated cycle and at a designated duty ratio in response to an instruction from the PCM 100 to be described later. Hereinafter, an energization period with respect to one cycle T of the flow rate control valve 75, in other words, a ratio of the valve closing period T2 is simply referred to as a duty ratio of the flow rate control valve 75, as necessary.

As described above, in view of that the flow rate control valve 75 is of a normal open type, when a duty ratio of the flow rate control valve 75 is set to 0%, and electric power supply to the driving portion 75b is stopped, the valve body 75a of the flow rate control valve 75 is fully opened. On the other hand, when a duty ratio of the flow rate control valve 75 is set to 100%, and electric power is continuously supplied to the driving portion 75b, the valve body 75a is kept in a fully closed state.

Specifically, the driving portion 75b includes a coil 171 for generating an electromagnetic force by receiving electric power supply, a fixed core 172 to be magnetized by the electromagnetic force generated in the coil 171, a movable core 173 movable toward and away from the fixed core 172, a driving pin 174 connected to the movable core 173 and configured to move together with the movable core 173, a retainer 175 mounted on a distal end of the driving pin 174, and a spring 176 disposed between the fixed core 172 and the retainer 175. The valve body 75a is connected to the driving pin 174, and moves together with the driving pin 174 and the movable core 173. The spring 176 is disposed in such a way as to urge the retainer 175 upwardly in FIG. 4, and in a direction for opening the valve body 75a. When electric power is supplied to the coil 171, as illustrated in FIG. 4, the movable core 173 is attracted to the fixed core 172, and the valve body 75a is fully closed. On the other hand, when electric power supply to the coil 171 is stopped, the retainer 175 and the valve body 75a move upwardly in FIG. 4 by an urging force of the spring 176, and the valve body 75a is fully opened.

The pressure sensor SN5 for detecting a pressure of cooling water flowing through the EGR cooling water passage 63 is provided in the EGR cooling water passage 63. The pressure sensor SN5 is provided at a position between the cylinder head 4 and the flow rate control valve 75, specifically, at a position downstream with respect to the cylinder head 4 and upstream with respect to the flow rate control valve 75 in a flow direction of cooling water indicated by the one-dotted-chain-line arrows in FIG. 2. The pressure sensor SN5 detects a pressure of cooling water flowing through the position.

The EGR cooling water passage 63 is connected to the main cooling water passage 62 at a position between the heater core 74 and the flow rate control valve 75 via the communication passage 65. Specifically, the communication passage 65 for connecting the combustion-chamber-side water jacket 62b and the exhaust-port-side water jacket 63b is formed in the cylinder head 4. The EGR cooling water passage 63 and the main cooling water passage 62 are connected by the communication passage 65 within the cylinder head 4.

The valve passage 66 is a passage for connecting the combustion-chamber-side water jacket 62b, and a portion between the heater core 74 of the EGR cooling water passage 63 and the exhaust-port-side water jacket 63b. A part of cooling water within the combustion-chamber-side water jacket 62 merges in the EGR cooling water passage 63 through the valve passage 66, and via a throttle valve (ETB) 32 and a bypass valve (ABV) 39.

(ATF Cooling Water Passage)

The ATF cooling water passage 64 is a passage for bypassing a part of the main cooling water passage 62, independently of the EGR cooling water passage 63. The ATF cooling water passage 64 connects the block-side water jacket 62a and the water pump 61. As indicated by the broken-line arrows in FIG. 2, a part of cooling water within the block-side water jacket 62a is branched from the main cooling water passage 62, and returns to the water pump 61 via an ATF warmer (ATF/W) 76 and an oil cooler (O/C) 77. The ATF warmer 76 is a device for warming automatic transmission fluid (ATF), in other words, liquid for use in a transmission. The oil cooler 77 is a device for cooling lubricating oil to be supplied to the engine body 1 and the like.

A second thermostat valve (T/S) 78 for opening and closing a portion of the ATF cooling water passage 64, which corresponds to a connecting portion between the ATF warmer 76 and the main cooling water passage 62 (block-side water jacket 62a), is interposed in the portion. The second thermostat valve 78 is a thermostat valve in which a valve opening temperature is fixed.

(3) Control System

Figure 6:
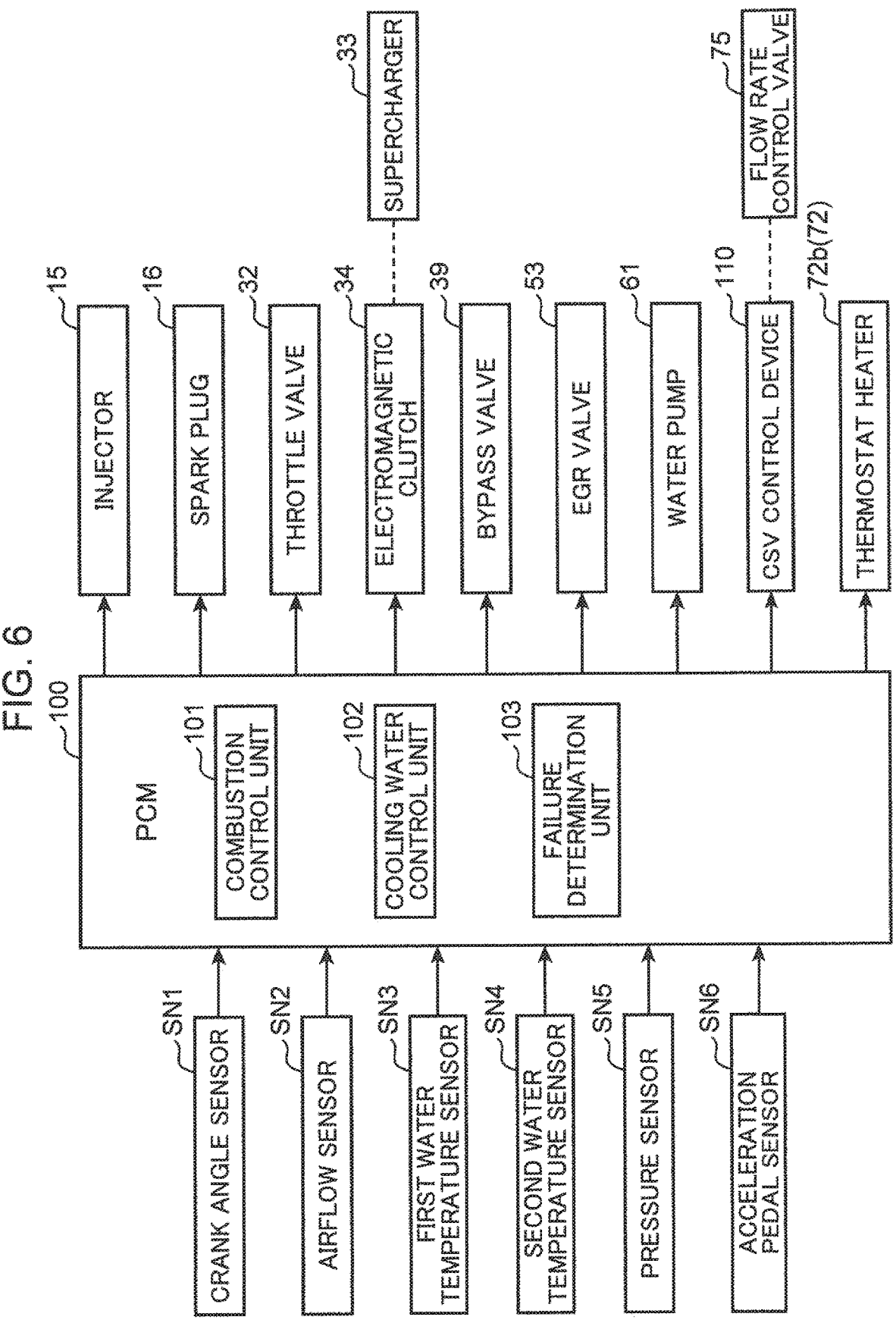
FIG. 6 is a block diagram illustrating a control system of the engine.

FIG. 6 is a block diagram illustrating a control system of the engine. The PCM 100 illustrated in FIG. 6 is a microprocessor for integrally controlling the engine and the like, and is constituted of a known CPU, ROM, RAM, and the like.

Detection signals from various sensors are input to the PCM 100. For example, the PCM 100 is electrically connected to the crank angle sensor SN1, the airflow sensor SN2, the first temperature sensor SN3, the second water temperature sensor SN4, and the pressure sensor SN5. The PCM 100 successively receives information detected by these sensors (in other words, a crank angle, an engine rotation speed, an intake flow rate, an engine water temperature, a temperature of cooling water at an exit of the cylinder head 4, and a pressure of cooling water). Further, an acceleration pedal sensor SN6 for detecting an opening angle of an acceleration pedal, which is operated by a driver driving the vehicle, is provided in the vehicle. The PCM 100 also successively receives a detection signal from the acceleration pedal sensor SN6.

The PCM 100 controls each part of the engine, while executing various determinations, calculations, and the like, based on input information from each sensor. The PCM 100 is electrically connected to the injector 15, the spark plug 16, the throttle valve 32, the electromagnetic clutch 34, the bypass valve 39, the EGR valve 53, the water pump 61, the thermostat heater 72b (first thermostat valve 72), the CSV control device 110 (flow rate control valve 75), and the like. The PCM 100 outputs, to these equipment, a signal for controlling each of these equipment, based on a result of the calculations and the like.

The PCM 100 functionally includes a combustion control unit 101, a cooling water control unit 102, and a failure determination unit 103 by causing the PCM 100 to execute a predetermined program. The cooling water control unit 102 corresponds to "valve control device" in the claims, and the failure determination unit 103 corresponds to "failure determination device" in the claims.

(Combustion Control Unit)

The combustion control unit 101 is a control module for controlling combustion of fuel-air mixture within the combustion chamber 6. The combustion control unit 101 controls each part of the engine (the injector 15, the spark plug 16, and the like) in such a way that an engine output is set to an appropriate value according to a request from the driver. Specifically, the combustion control unit 101 calculates a requested output being a requested value of engine output, based on an opening angle of the acceleration pedal detected by the acceleration pedal sensor SN6, an engine rotation speed, and the like; and calculates an amount of air and an amount of fuel to be introduced to the combustion chamber 6, based on the requested output. Further, the combustion control unit 101 drives the throttle valve 32 and the injector 15 in such a way that the calculated amount of air and the calculated amount of fuel are introduced to the combustion chamber 6. Furthermore, the combustion control unit 101 changes an ignition timing of the spark plug 16, an opening angle of the EGR valve 53, and the like in such a way that SPCCI combustion is achieved in a low speed range, and SI combustion is achieved in a high speed range.

(Cooling Water Control Unit)

The cooling water control unit 102 is a control module for controlling the cooling device 60. In this section, control of the first thermostat valve 72 and the flow rate control valve 75 to be performed by the cooling water control unit 102 is described.

The cooling water control unit 102 determines a valve opening temperature of the first thermostat valve 72, and changes an energization amount to the thermostat heater 72b of the first thermostat valve 72.

The cooling water control unit 102 switches a valve opening temperature of the first thermostat valve 72 between a first temperature and a second temperature lower than the first temperature, depending on a wall temperature of the combustion chamber 6. Specifically, when a wall temperature of the combustion chamber 6 is lower than a predetermined reference wall temperature, the cooling water control unit 102 sets a valve opening temperature of the first thermostat valve 72 to the first temperature, and adjusts an energization amount to the thermostat heater 72b in such a way that a temperature of the thermostat heater 72b reaches a temperature associated with the first temperature. On the other hand, when a wall temperature of the combustion chamber 6 is equal to or higher than the reference wall temperature, the cooling water control unit 102 sets a valve opening temperature of the first thermostat valve 72 to the second temperature, and adjusts an energization amount to the thermostat heater 72b in such a way that a temperature of the thermostat heater 72b reaches a temperature associated with the second temperature. Thus, when an engine water temperature is lower than the first temperature, and warming up of the engine body 1 is not completed, cooling water cooled by the radiator 71 is inhibited from being supplied to the engine body 1, whereby warming up of the engine body 1 is promoted. On the other hand, when the engine water temperature rises to the first temperature or higher, and warming up of the engine body 1 is completed, supply of cooling water cooled by the radiator 71 to the engine body 1 is started, and cooling of the engine body 1 by the cooling water is started. However, when a wall temperature of the combustion chamber 6 is equal to or higher than the reference wall temperature, even when the engine water temperature is lower than the first temperature, as far as the engine water temperature is equal to or higher than the second temperature, the first thermostat valve 72 is opened, and cooling water cooled by the radiator 71 is supplied to the engine body 1.

The first temperature and the second temperature are set in advance, and are stored in the PCM 100. For example, the first temperature is set to about 90° C., and the second temperature is set to about 80° C. Further, the reference wall temperature is a temperature at which SPCCI combustion is appropriately achieved, and is set to a wall temperature of the combustion chamber 6, when the engine water temperature reaches about 120° C., for example, 116° C.

An estimated value is used for a wall temperature of the combustion chamber 6, based on which a valve opening temperature of the first thermostat valve 72 is switched. The cooling water control unit 102 estimates a wall temperature of the combustion chamber 6, based on a temperature of cooling water detected by the second water temperature sensor SN4.

The cooling water control unit 102 determines a duty ratio of the flow rate control valve 75, and outputs an instruction to the CSV control device 110 in such a way that the flow rate control valve 75 (valve body 75a) is opened and closed at the duty ratio.

When an engine water temperature is lower than the first temperature, and warming up of the engine body 1 is not completed, the cooling water control unit 102 inhibits the flow rate control valve 75 from opening, and sets the duty ratio to 100% to keep the flow rate control valve 75 in a fully closed state. In this way, in the present embodiment, when an engine water temperature is lower than the first temperature, opening of the flow rate control valve 75 is inhibited. The first temperature corresponds to a "set temperature" in the claims.

On the other hand, when an engine water temperature is equal to or higher than the first temperature, opening and closing of the flow rate control valve 75 is allowed, and the cooling water control unit 102 determines the duty ratio of the flow rate control valve 75 in such a way that a wall temperature of the combustion chamber 6 reaches a target wall temperature being a target value of the wall temperature. An estimated value is also used for the wall temperature of the combustion chamber 6. The target wall temperature is set in advance, and is stored in the cooling water control unit 102. In the present embodiment, the target wall temperature is set to a temperature equal to or lower than the reference wall temperature.

Specifically, when a wall temperature of the combustion chamber 6 is higher than the target wall temperature, the cooling water control unit 102 decreases the duty ratio of the flow rate control valve 75, and extends the valve opening period T1 of the flow rate control valve 75. When the valve opening period T1 of the flow rate control valve 75 is extended, a flow rate of cooling water flowing through the block-side water jacket 62a and the exhaust-port-side water jacket 63b, which are included in the EGR cooling water passage 63 in which the flow rate control valve 75 is provided, increases. Then, cooling of the engine body 1 is promoted, and the wall temperature of the combustion chamber 6 is lowered. On the other hand, when a wall temperature of the combustion chamber 6 is lower than the target wall temperature, the cooling water control unit 102 increases the duty ratio of the flow rate control valve 75, and shortens the valve opening period T1 of the flow rate control valve 75, thereby lowering a flow rate of cooling water flowing through the block-side water jacket 62a and the exhaust-port-side water jacket 63b. Thus, cooling of the engine body 1 is suppressed, and the wall temperature of the combustion chamber 6 rises.

As described above, the valve opening temperature of the second thermostat valve 78 is fixed. When an engine water temperature reaches a predetermined temperature or higher, the second thermostat valve 78 is opened, irrespective of an operating state of the engine. The valve opening temperature of the second thermostat valve 78 is set to a temperature lower than the first temperature, for example, to 50° C.

In the above configuration, when the engine is started in a state that an engine water temperature is lower than the valve opening temperature of the second thermostat valve 78, in other words, when the engine is started in a cold state, immediately after the engine is started, all of the first thermostat valve 72, the second thermostat valve 78, and the flow rate control valve 75 are kept in a closed state. Thus, cooling of the engine body 1 by cooling water is not performed, and warming up of the engine body 1 is promoted. When warming up of the engine body 1 is promoted, and the engine water temperature reaches the valve opening temperature of the second thermostat valve 78 or higher, the second thermostat valve 78 is opened. Thus, cooling water flows through the ATF cooling water passage 64, and cooling water whose temperature is raised within the block-side water jacket 62a is introduced to the ATF warmer 76, whereby the ATF is warmed. When the temperature of the cooling water further rises, and reaches the first temperature or higher, in other words, when warming up of the engine body 1 is completed, the second thermostat valve 78 is opened. Thus, as described above, cooling of cooling water by the radiator 71 is started, and cooling of the engine body 1 by the cooled cooling water is started. Further, when the temperature of the cooling water reaches the first temperature or higher, opening of the flow rate control valve 75 is allowed, and the flow rate control valve 75 is opened and closed in such a way that a wall temperature of the combustion chamber 6 reaches the target wall temperature.

(Failure Determination Unit)

Figure 7:
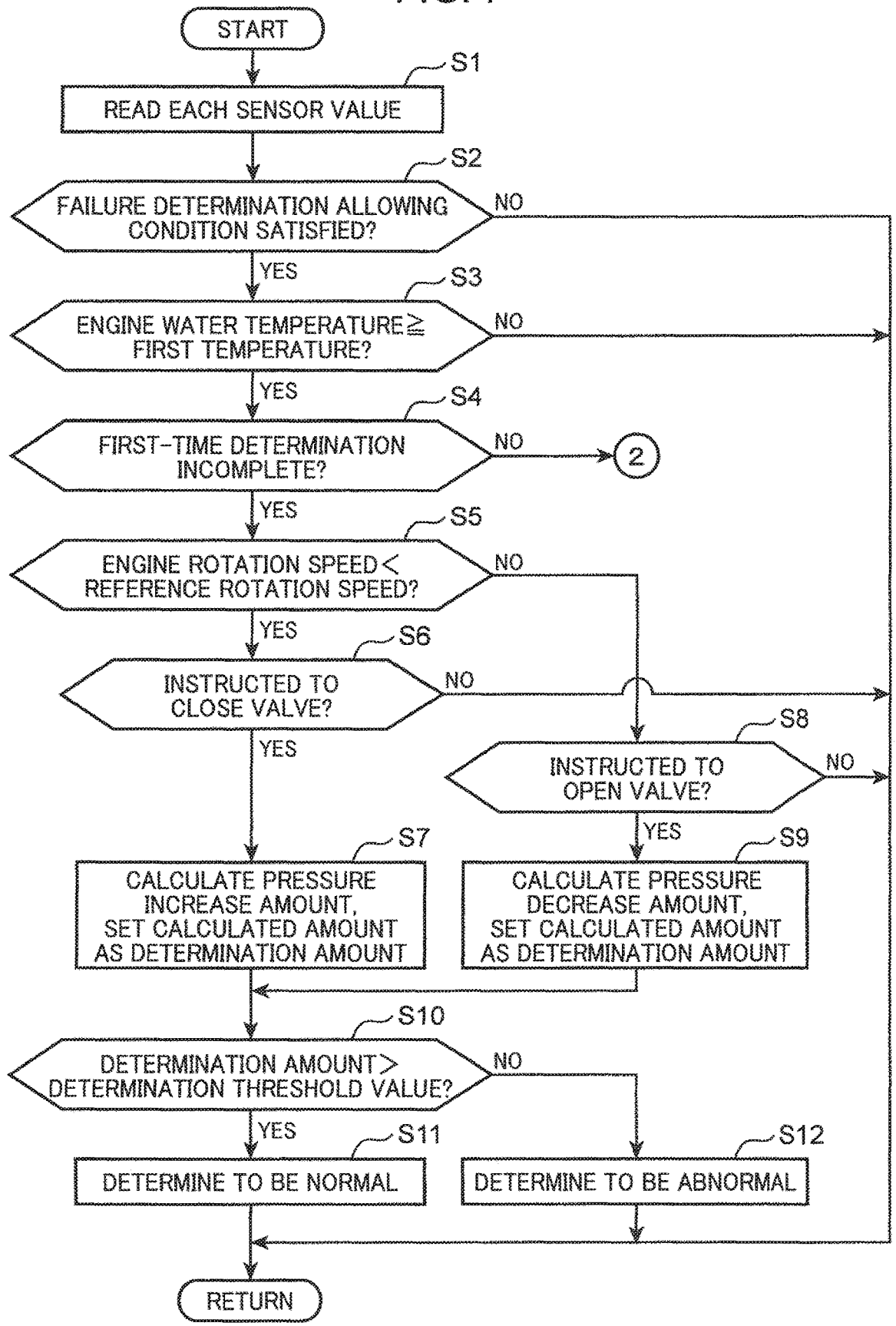
FIG. 7 is a flowchart illustrating a procedure of first-time failure determination of the flow rate control valve.
Figure 8:
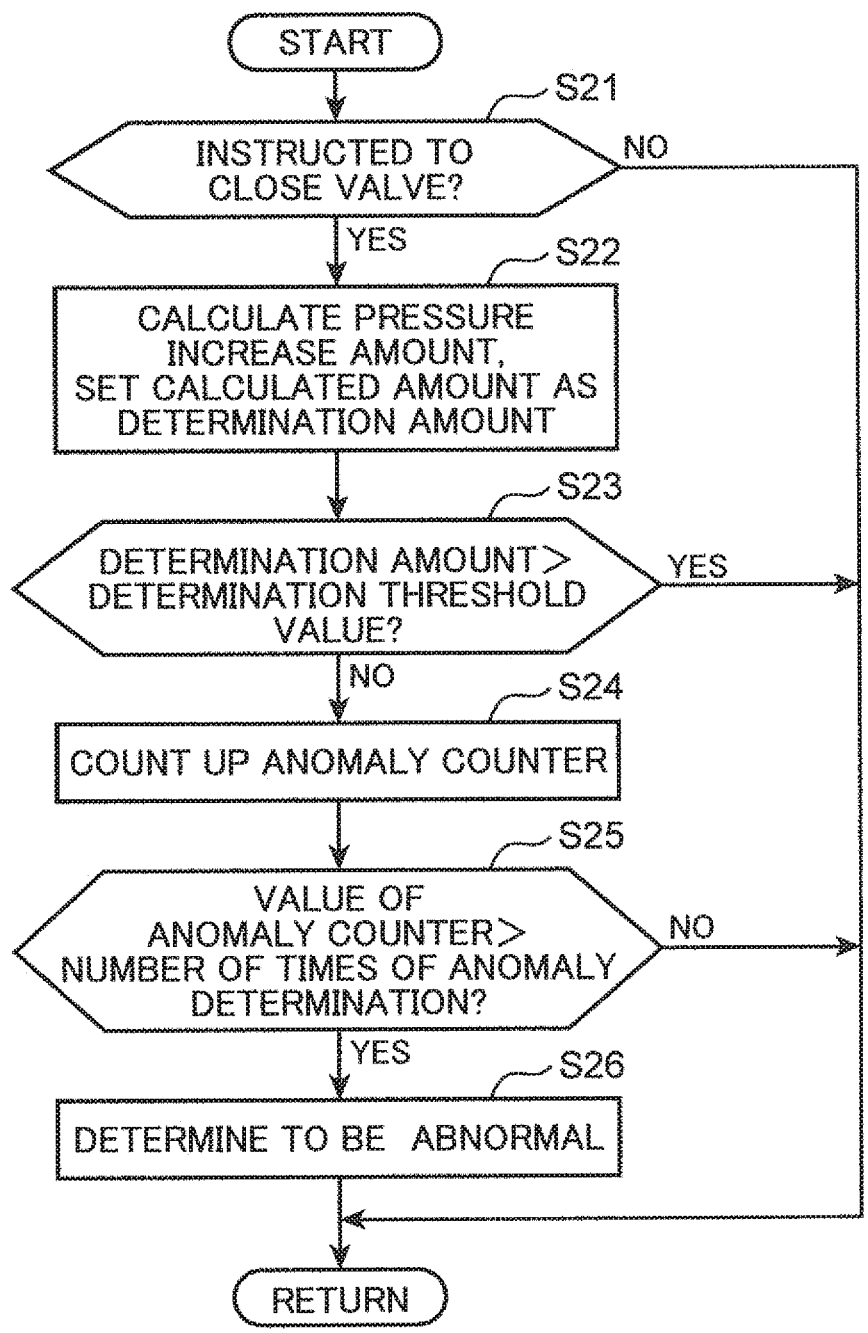
FIG. 8 is a flowchart illustrating a procedure of ordinary failure determination of the flow rate control valve.

The failure determination unit 103 is a control module for determining whether the flow rate control valve 75 has failed. A procedure of failure determination of the flow rate control valve 75 to be executed by the failure determination unit 103 is described with reference to FIGS. 7 and 8. FIG. 7 illustrates a procedure of failure determination (first-time failure determination) to be executed first time after the engine is started. FIG. 8 illustrates a procedure of failure determination to be executed after the engine is started and the first-time failure determination is finished.

First, in Step S1, the failure determination unit 103 reads a detection value of each sensor. The failure determination unit 103 reads an engine rotation speed detected by the crank angle sensor SN1, a temperature of cooling water detected by the first water temperature sensor SN3, in other words, an engine water temperature, a pressure of cooling water detected by the pressure sensor SN5, and the like.

Next, in Step S2, the failure determination unit 103 determines whether a failure determination allowing condition is satisfied. When the failure determination allowing condition is not satisfied, the failure determination unit 103 finishes the processing, without executing failure determination in Step S3 and thereafter (returns to Step S1). On the other hand, when the failure determination allowing condition is satisfied, the failure determination unit 103 proceeds to Step S3. In the present embodiment, it is determined that the failure determination allowing condition is satisfied, when an engine rotation speed is equal to or higher than a predetermined rotation speed lower than an idling rotation speed, startup of the engine is completed, and each sensor has not failed.

In Step S3, the failure determination unit 103 determines whether the engine water temperature is equal to or higher than the first temperature. When a determination result in Step S3 is NO, and the engine water temperature is lower than the first temperature, in other words, when warming up of the engine body 1 is not completed, the failure determination unit 103 finishes the processing as it is (returns to Step S1).

On the other hand, when a determination result in Step S3 is YES, the engine water temperature is equal to or higher than the first temperature, and warming up of the engine body 1 is completed, the failure determination unit 103 proceeds to Step S4. In Step S4, the failure determination unit 103 determines whether the first-time failure determination of the flow rate control valve 75 is incomplete. In other words, the failure determination unit 103 determines whether failure determination of the flow rate control valve 75 has not been executed at all after the engine is started.

When a determination result in Step S4 is NO, and the first-time failure determination of the flow rate control valve 75 is completed, the failure determination unit 103 proceeds to Step S21 in the flowchart illustrated in FIG. 8.

On the other hand, when a determination result in Step S4 is YES, and the first-time failure determination of the flow rate control valve 75 is incomplete, the failure determination unit 103 proceeds to Step S5. In Step S5, the failure determination unit 103 determines whether a current engine rotation speed is lower than a predetermined reference rotation speed. The reference rotation speed is set in advance, and is stored in the PCM 100. The reference rotation speed is, for example, set to about 2000 rpm.

When a determination result in Step S5 is YES, and the engine rotation speed is lower than the reference rotation speed, the failure determination unit 103 proceeds to Step S6.

In Step S6, the failure determination unit 103 determines whether a valve closing instruction to switch the flow rate control valve 75 from an opened state to a closed state is output to the flow rate control valve 75. As described above, it is configured in such a way that when the engine water temperature is equal to or higher than the first temperature, a duty ratio of the flow rate control valve 75 is determined based on a wall temperature of the combustion chamber 6. Further, it is configured in such a way that when the duty ratio is set to 100%, the flow rate control valve 75 is kept in a fully closed state, and when the duty ratio is set to 0%, the flow rate control valve 75 is kept in a fully opened state. Furthermore, it is configured in such a way that when the duty ratio is not smaller than 0% but smaller than 100%, the flow rate control valve 75 repeats opening and closing, in other words, cyclically switches from an opened state to a closed state. Thus, in Step S6, when the duty ratio of the flow rate control valve 75 is changed from 0% to 100%, or is determined to be a value smaller than 100% but larger than 0% by the cooling water control unit 102, the failure determination unit 103 determines that the valve closing instruction is output to the flow rate control valve 75. After Step S6, the failure determination unit 103 proceeds to Step S7.

In Step S7, the failure determination unit 103 calculates a pressure increase amount of cooling water within the EGR cooling water passage 63 accompanied by closing of the flow rate control valve 75, and sets the calculated amount as a determination amount for use in Step 10 to be described later.

When the flow rate control valve 75 is closed, flowing of cooling water is blocked by the flow rate control valve 75. At this occasion, cooling water within the EGR cooling water passage 63 collides with the flow rate control valve 75, a pipe, and the like by inertia thereof, and a so-called water hammer phenomenon occurs. Thus, as illustrated in FIG. 5, when the flow rate control valve 75 is closed (at a time t1 and the like), a pressure of cooling water within the EGR cooling water passage 63 rapidly increases from P1 to P2. In Step S7, the failure determination unit 103 calculates a pressure increase amount in this case. Specifically, the failure determination unit 103 calculates, as the pressure increase amount, a value acquired by subtracting, from a pressure detected by the pressure sensor SN5 at a timing when the flow rate control valve 75 is closed, a pressure detected by the pressure sensor SN5 at a timing immediately before the flow rate control valve 75 is closed. Then, the failure determination unit 103 determines the calculated value as a determination amount. After Step S7, the failure determination unit 103 proceeds to Step S10.

On the other hand, when a determination result in Step S5 is NO, and the engine rotation speed is equal to or higher than the reference rotation speed, the failure determination unit 103 proceeds to Step S8. In Step S8, the failure determination unit 103 determines whether a valve opening instruction to switch the flow rate control valve 75 from a closed state to an opened state is output to the flow rate control valve 75. Specifically, when the duty ratio of the flow rate control valve 75 is changed from 100% to a value other than 100% by the cooling water control unit 102, or is determined to be a value smaller than 100% but larger than 0%, the failure determination unit 103 determines that the valve opening instruction is output. After Step S8, the failure determination unit 103 proceeds to Step S9.

In Step S9, the failure determination unit 103 calculates a pressure decrease amount of cooling water within the EGR cooling water passage 63 accompanied by opening of the flow rate control valve 75, and sets the calculated amount, as a determination amount for use in Step S10 to be described later. As illustrated in FIG. 5, when the flow rate control valve 75 is opened (at a time t11 and the like), a pressure of cooling water within the EGR cooling water passage 63 is lowered from P11 to P1 by an increase in flow area of cooling water. In Step S9, the failure determination unit 103 calculates a pressure decrease amount in this case. Specifically, the failure determination unit 103 calculates, as the pressure decrease amount, a value acquired by subtracting, from a pressure detected by the pressure sensor SN5 at a timing when the flow rate control valve 75 is closed, a pressure detected by the pressure sensor SN5 at a timing after the flow rate control valve 75 is opened (when the flow rate control valve 75 is subsequently closed, a timing before the flow rate control valve 75 is closed). Then, the failure determination unit 103 determines the calculated value as the determination amount. After Step S9, the failure determination unit 103 proceeds to Step S10.

In Step S10, the failure determination unit 103 determines whether the determination amount (a pressure increase amount or a pressure decrease amount) determined in Step S7 or Step S9 is larger than a predetermined determination threshold value. When the determination result is YES, and the determination amount is larger than the determination threshold value, the failure determination unit 103 proceeds to Step S11, and determines that the flow rate control valve 75 is normally operated. On the other hand, when the determination result is NO, and the determination amount is equal to or smaller than the determination threshold value, the failure determination unit 103 proceeds to Step S12, and determines that the flow rate control valve 75 is in an anomalous state, in other words, has failed. The determination threshold value is set in advance to a value larger than 0, and is stored in the failure determination unit 103. The determination threshold value corresponds to a "first determination increase amount" and a "second determination decrease amount" in the claims.

In this way, when an engine rotation speed is lower than the reference rotation speed in the first-time failure determination, first failure determination, in which failure of the flow rate control valve 75 is determined based on a pressure increase amount of cooling water when a valve closing instruction is output to the flow rate control valve 75, is executed. On the other hand, when an engine rotation speed is equal to or higher than the reference rotation speed in the first-time failure determination, second failure determination, in which failure of the flow rate control valve 75 is determined based on a pressure decrease amount of cooling water when a valve closing instruction is output to the flow rate control valve 75, is executed.

Next, processing of Step S21 and thereafter to be executed when a determination result in Step S4 is NO is described.

In Step S21, the failure determination unit 103 determines whether a valve closing instruction is output to the flow rate control valve 75, as well as Step S6. When a determination result in Step S21 is NO, and a valve closing instruction is not output to the flow rate control valve 75, the failure determination unit 103 finishes the processing as it is (returns to Step S1). On the other hand, when a determination result in Step S21 is YES, and a valve closing instruction is output to the flow rate control valve 75, the failure determination unit 103 proceeds to Step S22. In Step S22, the failure determination unit 103 calculates a pressure increase amount of cooling water within the EGR cooling water passage 63 accompanied by closing of the flow rate control valve 75, based on a detection value of the pressure sensor SN5, and sets the calculated amount as a determination amount, as well as Step S7. After Step S22, the failure determination unit 103 proceeds to Step S23. In Step S23, the failure determination unit 103 determines whether the determination amount is larger than the determination threshold value, as well as Step S10.

When a determination result in Step S23 is YES, and the determination amount is larger than the determination threshold value, the failure determination unit 103 finishes the processing as it is (returns to Step S1). In other words, a result of the first-time failure determination is maintained. On the other hand, when a determination result in Step S23 is NO, and the determination amount is equal to or smaller than the determination threshold value, the failure determination unit 103 proceeds to Step S24. In Step S24, an anomaly counter is counted up. The anomaly counter is a counter that is incremented by one, each time when a determination result in Step S23 is NO, and is reset to 0, when the engine is stopped. After Step S24, the failure determination unit 103 proceeds to Step S25.

In Step S25, the failure determination unit 103 determines whether a value of the anomaly counter is larger than a predetermined number of times of anomaly determination. When a determination result in Step S25 is YES, and the value of the anomaly counter is larger than the number of times of anomaly determination, the failure determination unit 103 proceeds to Step S26, and finishes the processing by determining that the flow rate control valve 75 is in an anomalous state (returns to Step S1). On the other hand, when a determination result in Step S25 is NO, and the value of the anomaly counter is equal to or smaller than the number of times of anomaly determination, the failure determination unit 103 finishes the processing as it is (returns to Step S1). The number of times of anomaly determination is set in advance to a value larger than 0, and is stored in the failure determination unit 103.

In this way, after the first-time failure determination is finished, determination is made as to whether the flow rate control valve 75 has failed, based on a pressure increase amount of cooling water when a valve closing instruction is output to the flow rate control valve 75, irrespective of an engine rotation speed, and the flow rate control valve 75 is determined to be in an anomalous state, when the number of times when the pressure increase amount falls to the determination threshold value or below is larger than the number of times of anomaly determination.

(4) Operations and the Like

As described above, in the present embodiment, it is determined whether the flow rate control valve 75 has failed, based on a pressure change of the EGR cooling water passage 63 in which the flow rate control valve 75 is provided, when the flow rate control valve 75 is opened and closed (when a valve opening/closing instruction is output). As illustrated in FIG. 5, a pressure of cooling water sensitively changes accompanied by opening and closing of the flow rate control valve 75. In view of the above, in the present embodiment, determination is made as to whether the flow rate control valve 75 has failed, based on a pressure change of cooling water. Thus, the present embodiment is able to perform the determination at an early stage and with accuracy.

Further, in the present embodiment, when the first-time failure determination of the flow rate control valve 75 is executed, a determination method is differentiated between a case that an engine rotation speed is lower than the reference rotation speed, and a case that an engine rotation speed is equal to or higher than the reference rotation speed. Therefore, it is possible to more accurately determine whether the flow rate control valve 75 has failed.

Figure 9:
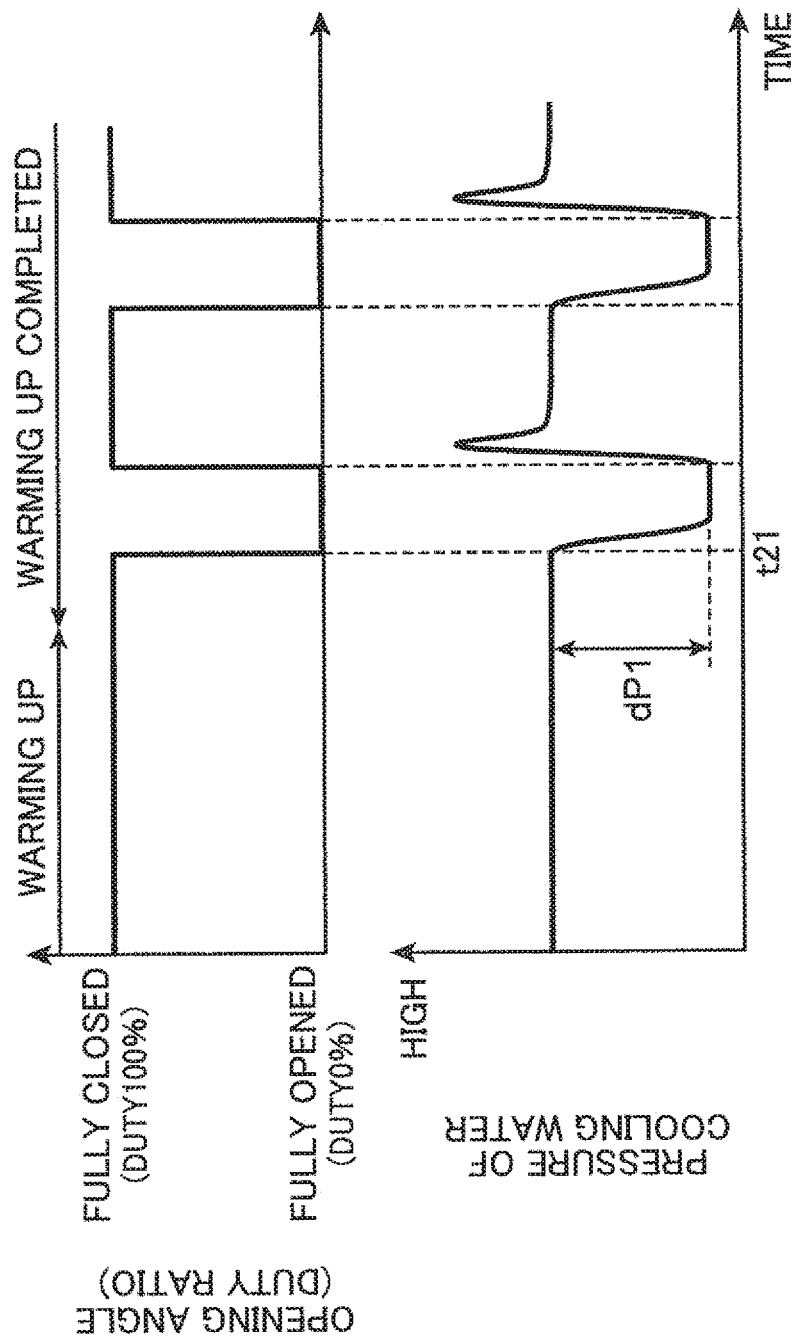
FIG. 9 is a diagram illustrating an opening angle of the flow rate control valve, and a pressure of cooling water, when an engine rotation speed is low.
Figure 10:
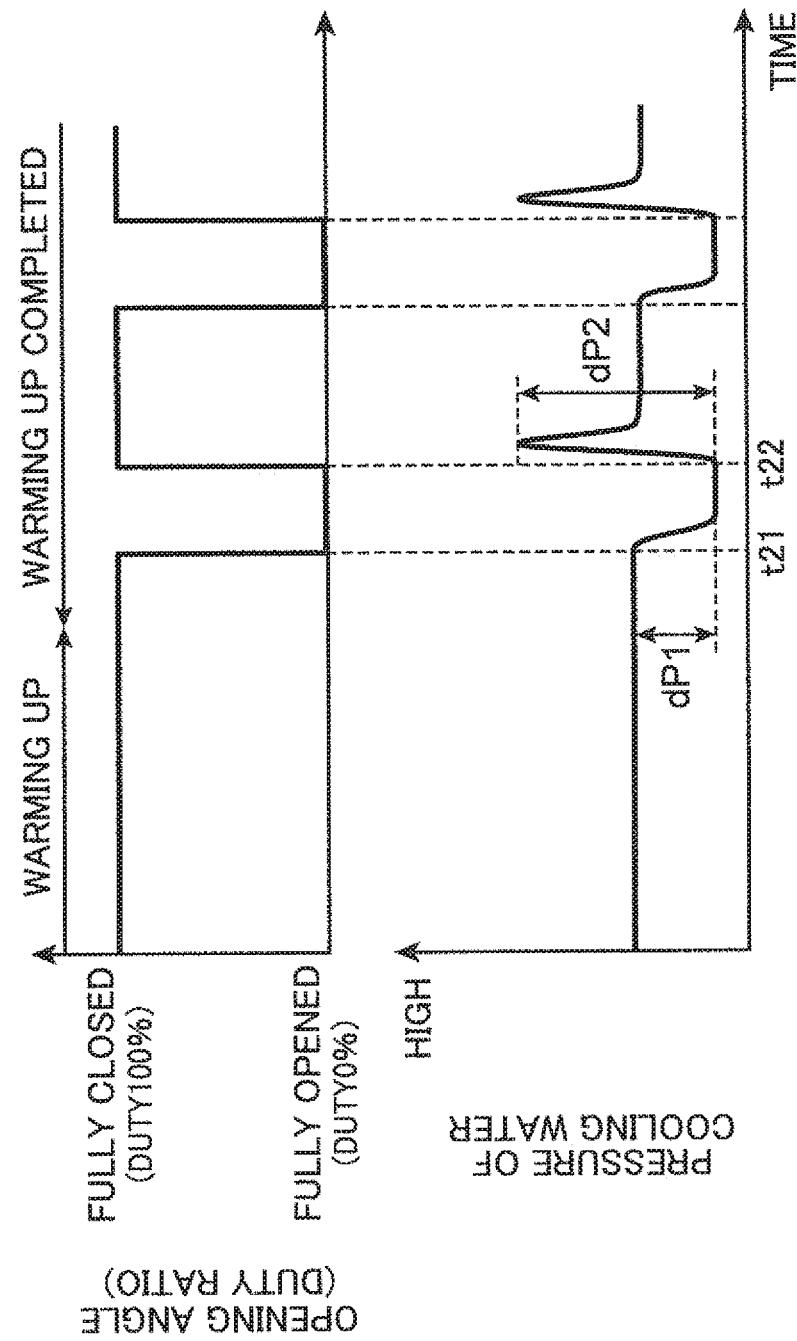
FIG. 10 is a diagram illustrating an opening angle of the flow rate control valve, and a pressure of cooling water, when an engine rotation speed is high.

The above configuration is more specifically described with reference to FIGS. 9 and 10. FIG. 9 is a graph illustrating an opening angle of the flow rate control valve 75, and a time-wise pressure change of cooling water, when the flow rate control valve 75 is opened and closed in a case where an engine rotation speed is high. FIG. 10 is a graph illustrating a time-wise change in these parameters, when an engine rotation speed is low. When an engine rotation speed is high, a discharge amount of the water pump 61 is large. Therefore, as illustrated in FIG. 9, when the flow rate control valve 75 is normally opened and closed in a case where an engine rotation speed is high, a flow rate change of cooling water when the flow rate control valve 75 is switched from a fully closed state to a fully opened state at a time t21 is made large. A pressure change amount dP1 of cooling water is also large accompanied by the change. When it is assumed that the flow rate control valve 75 is not normally opened and closed, there is no change in flow rate of cooling water, and a pressure change amount of cooling water becomes substantially zero. Thus, when an engine rotation speed is high, a difference of pressure change of cooling water is made clear between a case that the flow rate control valve 75 is normally switched from a fully closed state to an opened state, and a case that the flow rate control valve 75 is not normally opened and closed.

In contrast, in the present embodiment, when an engine rotation speed is equal to or higher than the reference rotation speed, determination is made as to whether the flow rate control valve 75 has failed, based on a pressure change of cooling water when a valve opening instruction to switch the flow rate control valve 75 from a closed state to an opened state is output to the flow rate control valve 75.

Therefore, it is possible to accurately execute this determination. Further, as described above, when an engine water temperature has not reached the first temperature after the engine is started, and warming up of the engine is not completed, the flow rate control valve 75 is kept in a closed state, and opening and closing of the flow rate control valve 75 is allowed only after warming up of the engine is completed. For example, in the example of FIG. 9, opening and closing of the flow rate control valve 75 is started at the time t21 after lapse of a predetermined time from completion of warming up of the engine. Therefore, after the engine is started, the flow rate control valve 75 is not switched from an opened state to a closed state, but is switched from a closed state to an opened state. Thus, determining failure of the flow rate control valve 75 when the flow rate control valve 75 is switched from a closed state to an opened state enables to execute the determination at an earlier timing after the engine is started.

On the other hand, when an engine rotation speed is low, a discharge amount of the water pump 61 is small. Therefore, as illustrated in FIG. 10, a pressure change amount dP1 of cooling water accompanied by opening of the flow rate control valve 75 at a time t21 is suppressed to a small value, and a difference with respect to a pressure change amount when the flow rate control valve 75 is not normally opened and closed is made small. Thus, when an engine rotation speed is low, failure of the flow rate control valve 75 may not be accurately detected by determination based on a pressure change of cooling water when a valve opening instruction is output. In view of the above, in the present embodiment, when an engine rotation speed is low, failure of the flow rate control valve 75 is determined, based on a pressure change of cooling water when a valve closing instruction to switch the flow rate control valve 75 from an opened state to a closed state is output to the flow rate control valve 75.

As described above, when the flow rate control valve 75 is switched from an opened state to a closed state (at a time t22 in FIG. 10), if the flow rate control valve 75 is normally opened and closed, a pressure of cooling water rapidly increases. Thus, a pressure change amount dP2 of cooling water is large, even when an engine rotation speed is low. In view of the above, in the present embodiment, when an engine rotation speed is lower than the reference rotation speed, failure of the flow rate control valve 75 is determined, based on a pressure increase amount of cooling water when a valve closing instruction is output. This enables to accurately determine failure of the flow rate control valve 75, even when an engine rotation speed is low, and enables to accurately determine failure of the flow rate control valve 75 both in a case that an engine rotation speed is high, and a case that an engine rotation speed is low.

Further, in the present embodiment, as described above, when an engine water temperature is lower than the first temperature, the flow rate control valve 75 is kept in a closed state. Therefore, when an engine water temperature is lower than the first temperature, it is possible to prevent cooling water from circulating the engine body 1 through the EGR cooling water passage 63. Thus, it is possible to promote warming up of the engine body 1, while suppressing cooling of the engine body 1 by cooling water.

Let us assume that determination as to whether the flow rate control valve 75 has failed is made after the engine is started. Then, a necessity of determining failure of the flow rate control valve 75 again at an early stage thereafter is small. In view of the above, in the present embodiment, when the first-time failure determination is finished, determination is made as to whether the flow rate control valve 75 has failed, based on a pressure increase amount of cooling water when a valve closing instruction is output to the flow rate control valve 75, irrespective of an engine rotation speed. Therefore, it is possible to remarkably reduce the number of times of switching a procedure of failure determination depending on an engine rotation speed, and simplify a control configuration, while achieving failure determination of the flow rate control valve 75 at an early stage as described above.

Further, in the present embodiment, when a pressure decrease amount of cooling water is larger than the determination threshold value (when the first-time failure determination is executed in a state that an engine rotation speed is high), and when a pressure increase amount of cooling water is larger than the determination threshold value (when the first-failure determination is executed in a state that an engine rotation speed is low, and when failure determination other than the first-time failure determination is executed), the flow rate control valve 75 is determined to have failed. In other words, by comparing a pressure decrease amount or a pressure increase amount of cooling water with a predetermined value, failure of the flow rate control valve 75 is determined. This makes it easy to execute the determination.

In particular, in the present embodiment, a predetermined value for use in comparison with a pressure decrease amount, and a predetermined value for use in comparison with a pressure increase amount are set to a same value. This enables to simplify a control configuration.

Further, in the present embodiment, a duty ratio of the flow rate control valve 75 is set in such a way that a wall temperature of the combustion chamber 6 reaches the target wall temperature, and the flow rate control valve 75 is opened and closed in such a way that the wall temperature of the combustion chamber 6 reaches the target wall temperature. This enables to more securely set a wall temperature of the combustion chamber 6 to a temperature appropriate for combustion. In particular, in SPCCI combustion, it is necessary to perform compression ignition of a part of fuel-air mixture, and it is required to accurately control a wall temperature of the combustion chamber 6. In view of the above, in the present embodiment, it is possible to accurately control a wall temperature of the combustion chamber 6 to an appropriate temperature, and achieve appropriate SPCCI combustion.

(5) Modifications

In the foregoing, an embodiment according to the present invention has been described. The present invention, however, is not limited to the above, and for example, the following modified embodiments may be employed.

The embodiment describes a case that a procedure of failure determination is differentiated depending on an engine rotation speed, only when the first-time failure determination is executed. A procedure of failure determination may be differentiated depending on an engine rotation speed, also when failure determination is executed after the first-time failure determination.

Further, the embodiment describes a case that when failure determination of the flow rate control valve 75 is executed, a predetermined value for use in comparison with a pressure decrease amount of cooling water, and a predetermined value for use in comparison with a pressure increase amount are set to a same value. The predetermined values may be set to values different from each other.

The embodiment describes a case that a wall temperature of the combustion chamber 6 is estimated, based on information from the second water temperature sensor SN4. A configuration of acquiring a wall temperature of the combustion chamber 6 is not limited to the above. For example, a sensor for directly detecting a wall temperature of the combustion chamber 6 may be provided in the engine body 1.

A specific numerical value such as the first temperature and the second temperature described in the embodiment is merely an example. These temperatures may be changed as necessary according to a specific configuration of the engine body 1 and/or the cooling device 60.

The embodiment describes an example in which the cooling device 60 is applied to an engine capable of performing partial compression ignition combustion (SPCCI combustion). A combustion pattern of an engine to which the cooling device 60 is applied is not limited to the above. For example, the cooling device 60 is also applicable to an engine configured to be controlled in such a way that a combustion pattern in all operation ranges is SI combustion.

The above specific embodiment discloses a cooling device for an engine, and a failure determination method of the cooling device having the following configuration.

A cooling device for an engine according to one aspect of the present invention is a cooling device for an engine provided with a water pump to be driven to rotate by the engine. The cooling device includes: a cooling water passage for circulating cooling water discharged from the water pump via an engine body; a flow rate control valve capable of opening and closing the cooling water passage; a pressure sensor for detecting a pressure of cooling water flowing through the cooling water passage; a failure determination device for determining whether the flow rate control valve has failed; and a valve control device for controlling the flow rate control valve by outputting a valve opening/closing instruction to the flow rate control valve. The failure determination device executes, when an engine rotation speed is lower than a predetermined reference rotation speed, first failure determination in which failure of the flow rate control valve is determined based on a pressure change of cooling water detected by the pressure sensor, when a valve closing instruction to switch the flow rate control valve from an opened state to a closed state is output from the valve control device. The failure determination device executes, when an engine rotation speed is equal to or higher than the reference rotation speed, second failure determination in which failure of the flow rate control valve is determined based on a pressure change of cooling water detected by the pressure sensor, when a valve opening instruction to switch the flow rate control valve from a closed state to an opened state is output from the valve control device. This enables to determine whether the flow rate control valve has failed at early stage.

When a flow rate of cooling water flowing through the cooling water passage changes, a pressure of cooling water within the cooling water passage changes at an early stage, as compared with a temperature of the cooling water. In view of the above, in the present invention, determination as to whether the flow rate control valve has failed is made based on a pressure change of cooling water accompanied by opening and closing of the flow rate control valve.

Further, in the cooling device, a determination method is differentiated between a case that an engine rotation speed is lower than the reference rotation speed, and a case that an engine rotation speed is equal to or higher than the reference rotation speed. This enables to accurately determine whether the flow rate control valve has failed.

Specifically, when an engine rotation speed is high, a discharge amount of the water pump is large. Therefore, a flow rate and a pressure change amount of cooling water is made large, when the flow rate control valve is opened from a fully closed state. Thus, when an engine rotation speed is high, a difference of pressure change of cooling water is made clear between a case that the flow rate control valve is normally opened from a fully closed state, and a case that the flow rate control valve is not normally opened and closed. In view of the above, in the present invention, the second failure determination is executed, when an engine rotation speed is higher than the reference rotation speed, and failure of the flow rate control valve is determined based on a pressure change of cooling water when a valve opening instruction to switch the flow rate control valve from a closed state to an opened state is output to the flow rate control valve, specifically, based on a parameter that is clearly differentiated between a case that the flow rate control valve is normally operated, and a case that the flow rate control valve has failed as described above. This enables to accurately determine whether the flow rate control valve has failed. Further, it becomes possible to determine failure of the flow rate control valve immediately after the flow rate control valve is opened after warming up of the engine is completed from a closed state of the flow rate control valve, which is accompanied by that the engine is not warmed up and the like. This is more advantageous in detecting the failure at an early stage.

However, when an engine rotation speed is low, a pressure change of cooling water accompanied by opening of the flow rate control valve is small, since a discharge amount of the water pump is small. Therefore, when an engine rotation speed is low, failure of the flow rate control valve may not be accurately detected by the second failure determination. When the flow rate control valve is operated from an opened state to a closed state, a so-called water hammer phenomenon that cooling water collides with the flow rate control valve and the like by inertia thereof occurs. This may greatly increase a pressure within the cooling water passage, even when a flow rate of cooling water is small. In other words, when the flow rate control valve is operated from an opened state to a closed state, even when an engine rotation speed is low, it is possible to clearly differentiate a pressure change of cooling water between a case that the flow rate control valve is normally closed, and a case that the flow rate control valve is not normally opened and closed. In view of the above, in the present invention, when an engine rotation speed is lower than the reference rotation speed, the first failure determination is executed, and failure of the flow rate control valve is determined based on a pressure change of cooling water when a valve closing instruction to switch the flow rate control valve from an opened state to a closed state is output to the flow rate control valve, whereby it is possible to accurately determine failure of the flow rate control valve, even when an engine rotation speed is low. Thus, it is possible to accurately determine failure of the flow rate control valve in both of a case that an engine rotation speed is high, and a case that an engine rotation speed is low.

In the above configuration, preferably, the failure determination device may determine when the first failure determination is executed, that the flow rate control valve has failed, when a pressure increase amount of the cooling water is equal to or smaller than a predetermined first determination increase amount, and determine, when the second failure determination is executed, that the flow rate control valve has failed, when a pressure decrease amount of the cooling water is equal to or smaller than a predetermined second determination decrease amount.

The above configuration enables to easily determine whether the flow rate control valve has failed by comparison of the pressure increase amount or the pressure decrease amount of cooling water with a predetermined value.

In the above configuration, preferably, the valve control device may inhibit the flow rate control valve from opening, when a temperature of cooling water flowing through the cooling water passage is lower than a predetermined set temperature, and allow the flow rate control valve to open, when a temperature of the cooling water is equal to or higher than the set temperature. The failure determination device may inhibit execution of the first failure determination and the second failure determination, when the temperature of cooling water is lower than the set temperature, and allow execution of the first failure determination and the second failure determination, when the temperature of cooling water is equal to or higher than the set temperature.

In the above configuration, when a temperature of cooling water is lower than the set temperature, and a temperature of the engine body is low, the flow rate control valve is fully closed, and circulation of cooling water is stopped. This enables to promote warming up of the engine body by avoiding that the engine body is cooled by cooling water. Further, when a temperature of cooling water is lower than the set temperature, execution of the first failure determination and the second failure determination is inhibited. Therefore, it is possible to avoid cooling of the engine body by cooling water by opening the flow rate control valve accompanied by execution of the first and second failure determinations, when a temperature of cooling water is lower than the set temperature. Furthermore, when a temperature of cooling water is equal to or higher than the set temperature, cooling of the engine body by cooling water is enabled. Therefore, it is possible to prevent an excessive increase in temperature of cooling water and temperature of the engine body. Moreover, allowing execution of the first failure determination and the second failure determination enables to determine failure of the flow rate control valve.

Further, in the cooling device for the engine, as described above, execution of the second failure determination enables to determine failure of the flow rate control valve immediately after a valve opening instruction is output to the flow rate control valve from a state that the flow rate control valve is kept in a fully closed state. Thus, the above configuration enables to concurrently perform early warming up of the engine body, and early failure determination of the flow rate control valve.

In the above configuration, preferably, the valve control device may control the flow rate control valve to open and close in such a way that a wall temperature of a combustion chamber formed in the engine body reaches a predetermined target temperature, when the temperature of cooling water is equal to or higher than the set temperature.

The above configuration enables to accurately determine failure of the flow rate control valve by executing the first failure determination or the second failure determination, when the flow rate control valve is opened and closed, while controlling a wall temperature of the combustion chamber to an appropriate temperature by opening and closing the flow rate control valve.

In the above configuration, preferably, the failure determination device may allow execution of the second failure determination, only when both of the first failure determination and the second failure determination are not executed after the engine is started.

As described above, the second failure determination enables to determine failure of the flow rate control valve immediately after a valve opening instruction is output to the flow rate control valve from a fully closed state of the flow rate control valve. Therefore, in the above configuration, allowing execution of the second failure determination when both of the first failure determination and the second failure determination are not executed after the engine is started enables to determine failure of the flow rate control valve at an earlier timing after the engine is started. A necessity of determining failure of the flow rate control valve again at an early stage is small, after the first failure determination and the second failure determination have already been executed, and determination as to whether the flow rate control valve has failed has already been executed. In view of the above, in the above configuration, execution of the second failure determination is inhibited after the first failure determination or the second failure determination has already been executed. Therefore, it is possible to simplify a control configuration, while advantageously achieving early failure determination of the flow rate control valve as described above.

A failure determination method of a cooling device for an engine according to yet another aspect of the present invention is a failure determination method of a cooling device for an engine provided with a water pump to be driven to rotate by the engine, a cooling water passage for circulating cooling water discharged from the water pump via an engine body, a flow rate control valve capable of opening and closing the cooling water passage, a pressure sensor for detecting a pressure of cooling water flowing through the cooling water passage, and a valve control device for controlling the flow rate control valve by outputting a valve opening/closing instruction to the flow rate control valve. The method includes: when an engine rotation speed is lower than a predetermined reference rotation speed, executing first failure determination in which failure of the flow rate control valve is determined based on a pressure change of cooling water detected by the pressure sensor, when a valve closing instruction to switch the flow rate control valve from an opened state to a closed state is output from the valve control device; and when an engine rotation speed is equal to or higher than the reference rotation speed, executing second failure determination in which failure of the flow rate control valve is determined based on a pressure change of cooling water detected by the pressure sensor, when a valve opening instruction to switch the flow rate control valve from a closed state to an opened state is output from the valve control device.

Also in this method, failure of the flow rate control valve is determined based on a parameter that is clearly differentiated between a case that the flow rate control valve is normally operated, and a case that the flow rate control valve has failed both when an engine rotation speed is high and when an engine rotation speed is low. Therefore, the method also enables to accurately determine failure of the flow rate control valve, even when an engine rotation speed is low. Thus, it is possible to accurately determine failure of the flow rate control valve both when an engine rotation speed is high and when an engine rotation speed is low.

The present invention described above enables to determine whether a flow rate control valve has failed at an earlier stage and with accuracy.

Although the present invention has been fully described by way of example with reference to the accompanying drawings, it is to be understood that various changes and modifications will be apparent to those skilled in the art.

Therefore, unless otherwise such changes and modifications depart from the scope of the present invention hereinafter defined, they should be construed as being included therein.

What is claimed is:

1. A cooling device for an engine provided with a water pump to be driven to rotate by the engine, the cooling device comprising:
    a cooling water passage for circulating cooling water discharged from the water pump via an engine body;
    a flow rate control valve capable of opening and closing the cooling water passage;
    a pressure sensor for detecting a pressure of cooling water flowing through the cooling water passage; and
    a controller configured to execute functions of a failure determination device for determining whether the flow rate control valve has failed and a valve control device for controlling the flow rate control valve by outputting a valve opening/closing instruction to the flow rate control valve, wherein
    when an engine rotation speed is lower than a predetermined reference rotation speed and when a valve closing instruction to switch the flow rate control valve from an opened state to a closed state is output from the valve control device, the failure determination device executes a first failure determination in which failure of the flow rate control valve is determined based on a pressure change of cooling water detected by the pressure sensor, and
    when the engine rotation speed is equal to or higher than the reference rotation speed and when a valve opening instruction to switch the flow rate control valve from the closed state to the opened state is output from the valve control device, the failure determination device executes a second failure determination in which failure of the flow rate control valve is determined based on the pressure change of cooling water detected by the pressure sensor,
    when the first failure determination is executed and when a pressure increase amount of the cooling water is equal to or smaller than a predetermined first determination increase amount, the failure determination device determines that the flow rate control valve has failed, and
    when the second failure determination is executed and when a pressure decrease amount of the cooling water is equal to or smaller than a predetermined second determination decrease amount, the failure determination device determines that the flow rate control valve has failed.

2. A cooling device for an engine provided with a water pump to be driven to rotate by the engine, the cooling device comprising:
    a cooling water passage for circulating cooling water discharged from the water pump via an engine body;
    a flow rate control valve capable of opening and closing the cooling water passage;
    a pressure sensor for detecting a pressure of cooling water flowing through the cooling water passage; and
    a controller configured to execute functions of a failure determination device for determining whether the flow rate control valve has failed and a valve control device for controlling the flow rate control valve by outputting a valve opening/closing instruction to the flow rate control valve, wherein
    the valve control device inhibits the flow rate control valve from opening when a temperature of cooling water flowing through the cooling water passage is lower than a predetermined set temperature, and allows the flow rate control valve to open when a temperature of the cooling water is equal to or higher than the set temperature,
    when an engine rotation speed is lower than a predetermined reference rotation speed and when a valve closing instruction to switch the flow rate control valve from an opened state to a closed state is output from the valve control device, the failure determination device executes a first failure determination in which failure of the flow rate control valve is determined based on a pressure change of cooling water detected by the pressure sensor,
    when the engine rotation speed is equal to or higher than the reference rotation speed and when a valve opening instruction to switch the flow rate control valve from the closed state to the opened state is output from the valve control device, the failure determination device executes a second failure determination in which failure of the flow rate control valve is determined based on the pressure change of cooling water detected by the pressure sensor, and
    the failure determination device inhibits execution of the first failure determination and the second failure determination when the temperature of cooling water is lower than the set temperature, and allows execution of the first failure determination and the second failure determination when the temperature of cooling water is equal to or higher than the set temperature.

3. The cooling device for the engine according to claim 2, wherein
    the valve control device controls the flow rate control valve to open and close in such a way that a wall temperature of a combustion chamber formed in the engine body reaches a predetermined target temperature, when the temperature of cooling water is equal to or higher than the set temperature.

4. The cooling device for the engine according to claim 3, wherein
    the failure determination device allows execution of the second failure determination, only when both of the first failure determination and the second failure determination are not executed after the engine is started.

5. A failure determination method of a cooling device for an engine provided with a water pump to be driven to rotate by the engine, a cooling water passage for circulating cooling water discharged from the water pump via an engine body, a flow rate control valve capable of opening and closing the cooling water passage, a pressure sensor for detecting a pressure of cooling water flowing through the cooling water passage, and a valve control device for controlling the flow rate control valve, the valve control device being executable by a controller to output a valve opening/closing instruction to the flow rate control valve, the method comprising:
    when an engine rotation speed is lower than a predetermined reference rotation speed and when a valve closing instruction to switch the flow rate control valve from an opened state to a closed state is output from the valve control device, executing a first failure determination in which failure of the flow rate control valve is determined based on a pressure change of cooling water detected by the pressure sensor;
    when the engine rotation speed is equal to or higher than the reference rotation speed and when a valve opening instruction to switch the flow rate control valve from the closed state to the opened state is output from the valve control device, executing a second failure determination in which failure of the flow rate control valve is determined based on the pressure change of cooling water detected by the pressure sensor;

when the first failure determination is executed and when a pressure increase amount of the cooling water is equal to or smaller than a predetermined first determination increase amount, determining that the flow rate control valve has failed; and when the second failure determination is executed and when a pressure decrease amount of the cooling water is equal to or smaller than a predetermined second determination decrease amount, determining that the flow rate control valve has failed.

* * * * *